United States Patent
Gaddehosur et al.

(10) Patent No.: US 10,505,761 B2
(45) Date of Patent: Dec. 10, 2019

(54) SCALABLE TENANT NETWORKS (71) Applicant: Microsoft Technology Licensing, LLC, Redmond, WA (US)

(72) Inventors: Poornananda R. Gaddehosur, Redmond, WA (US); Benjamin M. Schultz, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/054,638

(22) Filed: Aug. 3, 2018

(65) Prior Publication Data
US 2018/0375687 A1 Dec. 27, 2018

Related U.S. Application Data

(63) Continuation of application No. 15/859,247, filed on Dec. 29, 2017, now Pat. No. 10,044,525, which is a continuation of application No. 15/075,049, filed on Mar. 18, 2016, now abandoned.

(60) Provisional application No. 62/267,664, filed on Dec. 15, 2015.

(51) Int. Cl.
*H04L 12/28* (2006.01)
*H04L 12/46* (2006.01)
*H04L 12/24* (2006.01)
*H04L 29/08* (2006.01)
*G06F 9/455* (2018.01)

(52) U.S. Cl.
CPC ...... *H04L 12/4675* (2013.01); *G06F 9/45537* (2013.01); *H04L 41/0893* (2013.01); *H04L 41/12* (2013.01); *H04L 67/1031* (2013.01)

(58) Field of Classification Search
CPC ............ H04L 12/4675; H04L 41/0893; H04L 67/1031; G06F 9/45537
USPC ........ 370/252–253, 230–240, 395.2–395.53; 709/226–229
See application file for complete search history.

(56) References Cited

U.S. PATENT DOCUMENTS

| | | | | |
|---|---|---|---|---|
| 8,341,626 | B1* | 12/2012 | Gardner | G06F 9/4856 718/1 |
| 8,392,564 | B1* | 3/2013 | Czajkowski | H04L 41/5051 709/226 |
| 8,527,645 | B1* | 9/2013 | Proffit | G06F 9/505 709/229 |
| 8,839,317 | B1* | 9/2014 | Rieger | H04N 21/2408 375/240.01 |
| 9,621,588 | B2* | 4/2017 | Chan | H04L 63/20 |
| 2004/0181476 | A1* | 9/2004 | Smith | G06Q 40/00 705/35 |
| 2005/0268078 | A1* | 12/2005 | Zimmer | G06F 9/45533 713/1 |
| 2006/0259906 | A1* | 11/2006 | Czajkowski | G06F 9/5077 718/104 |

(Continued)

*Primary Examiner* — Thai D Hoang
(74) *Attorney, Agent, or Firm* — Newport IP, LLC; Jacob P. Rohwer (57) ABSTRACT

Template-driven locally calculated policy updates for virtualized machines in a datacenter environment are described. A central control and monitoring node calculates and pushes down policy templates to local control and monitoring nodes. The templates provide boundaries and/or a pool of networking resources, from which the local control and monitoring node is enabled to calculate policy updates for locally instantiated virtual machines and containers.

20 Claims, 5 Drawing Sheets

(56) References Cited

U.S. PATENT DOCUMENTS

| | | | | |
|---|---|---|---|---|
| 2006/0282900 A1* | 12/2006 | Johnson | ............... | G06F 21/604 |
| | | | | 726/26 |
| 2008/0013460 A1* | 1/2008 | Allen | ............... | H04L 29/06027 |
| | | | | 370/252 |
| 2008/0049614 A1* | 2/2008 | Briscoe | ............... | H04L 41/0806 |
| | | | | 370/230 |
| 2008/0114635 A1* | 5/2008 | Shigeta | ............... | G06Q 10/06 |
| | | | | 705/7.12 |
| 2008/0117836 A1* | 5/2008 | Savoor | ............... | H04L 41/0896 |
| | | | | 370/254 |
| 2009/0254198 A1* | 10/2009 | Lu | ............... | G05B 13/04 |
| | | | | 700/7 |
| 2009/0319070 A1* | 12/2009 | Morningred | ............... | G06Q 10/06 |
| | | | | 700/103 |
| 2010/0037284 A1* | 2/2010 | Sachs | ............... | H04L 43/0847 |
| | | | | 726/1 |
| 2011/0126281 A1* | 5/2011 | Ben-Zvi | ............... | G06F 21/6218 |
| | | | | 726/21 |
| 2011/0239013 A1* | 9/2011 | Muller | ............... | G06F 1/3221 |
| | | | | 713/320 |
| 2012/0260303 A1* | 10/2012 | Wollnik | ............... | G06F 21/6218 |
| | | | | 726/1 |
| 2014/0222977 A1* | 8/2014 | Varney | ............... | H04L 41/0893 |
| | | | | 709/220 |
| 2015/0254787 A1* | 9/2015 | Eger | ............... | G06Q 50/06 |
| | | | | 700/291 |
| 2016/0291671 A1* | 10/2016 | Rider | ............... | H02J 13/0006 |
| 2017/0047775 A1* | 2/2017 | Itaya | ............... | G06F 1/26 |
| 2017/0201489 A1* | 7/2017 | Chan | ............... | H04L 63/0245 |

\* cited by examiner

SCALABLE TENANT NETWORKS

PRIORITY APPLICATIONS

This patent application is a continuation application of, and claims priority to, co-pending, commonly owned U.S. Non-Provisional patent application Ser. No. 15/859,247, entitled "SCALABLE TENANT NETWORKS", filed on Dec. 29, 2017, which is incorporated herein by reference in its entirety. U.S. Non-Provisional patent application Ser. No. 15/859,247 claims priority to U.S. Non-Provisional patent application Ser. No. 15/075,049, filed Mar. 18, 2016, and entitled "Scalable Tenant Networks", which is also incorporated herein by reference in its entirety. U.S. Non-Provisional patent application Ser. No. 15/075,049 claims priority to U.S. Provisional Patent Application No. 62/267,664, filed Dec. 15, 2015, and entitled "Scalable Tenant Networks", which is also incorporated herein by reference in its entirety.

BACKGROUND

Managing change in a datacenter has always been difficult. In the early days, people had to manually connect cables and update configuration files. Automation technologies and techniques such as Dynamic Host Configuration Protocol (DHCP), dynamic Domain Name System (DNS) registrations, Virtual Local Area Networks (VLANs), and switch management scripts lightened the load. Datacenters have experienced massive growth. To enable more flexibility, a new generation of technologies and techniques have been created such as network virtualization and network functions virtualization (NFV). These create flexibility to manage this new hyperscale datacenter. Recently, another variable has been added to the equation: containers and nested virtual machines (VMs). These developments abstract the tenant's network from the hoster's physical network and virtual network. This flexibility and multi-tenant isolation will add complex management overhead and ultimately, scalability.

BRIEF SUMMARY

This Summary is provided in order to introduce simplified concepts of the present disclosure, which are further described below in the Detailed Description. This summary is not intended to identify essential features of the claimed subject matter, nor is it intended for use in determining the scope of the claimed subject matter.

Examples of the present disclosure provide template-driven local policy updates for virtualized machines in a datacenter environment. A central control and/or monitoring node (e.g., a "central controller") calculates and pushes down policy templates to local control and/or monitoring nodes (e.g., the "local controllers"). The templates provide boundaries and/or a pool of networking resources, from which the local control and/or monitoring node is enabled to calculate policy updates for locally instantiated virtual machines and containers. The local control and monitoring node is configured to monitor the allotted resource utilization, and request from the central controller additional or updated templates and resources for those virtual machines and containers within its control.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

As noted above, the added flexibility and multi-tenant isolation will add complex management overhead and ultimately, scalability. Embodiments of the present application provide a way to manage this flexibility, in part by providing template-driven local policy updates for virtualized machines in a datacenter environment. A central control and monitoring node (referred to herein as "central controller") calculates and pushes down policy templates to local control and monitoring nodes (referred to herein as "local controllers"). The templates provide boundaries and/or a pool of networking resources, from which the local controller is enabled to calculate policy updates for locally instantiated virtual machines and containers. The local controller is configured to monitor the allotted resource utilization, and request from the central controller additional or updated templates and resources for those virtual machines and containers within its control. A typical datacenter deployment will have many central controllers and many local controllers. Some embodiments may support a 1:1 relationship between central controller instances and local controller instances. Other embodiments may have fewer central controllers servicing many more local controllers.

Containers are an isolated, resource-controlled, and portable operating environment. A software application can run in a container without affecting the rest of the system and without the system affecting the application. Containers may be specific to one application, or may provide the runtime for multiple applications, providing additional operating system functions and services (e.g. input/output functions, security, etc.).

Containers and nested virtual machines (VMs) (e.g., virtual machines executing within another virtual machine) introduce additional levels of abstraction to the datacenter, thereby increasing the complexity of the datacenter environment, including the networking infrastructure. This is especially true when new VMs or containers are instantiated, or when existing containers or VMs are moved.

To use just one example, a physical host has a physical IP address, a virtual machine executing within the physical host has a virtual IP address, and the nested VMs or containers executing within the virtual machine have their own IP addresses. These IP addresses may be on different subnets. Network Virtualization Functions (NVF) in the physical host may be used to encapsulate and de-encapsulate ("encap/decap") packets or to translate addresses from one layer of abstraction to another, and between physical and virtual layers. Thus, policies to perform such encap/decap or network address translation are updated at multiple levels each time a nested VM or container is instantiated or moved, thereby increasing the complexity of policy updates. Also, a container may be instantiated for as little as 10-90 milliseconds, just long enough to execute a script, before it is taken down. But utilizing a centralized network control and monitoring node to calculate and push networking policy updates for a newly instantiated virtual machine or container may take on the order of seconds or minutes to update the networking infrastructure. This may be too long for a container that may need to be reachable within a few milliseconds of being instantiated, and which may exist for only a few milliseconds before being deleted.

Embodiments of the present disclosure push policy calculations and updates to the local host environment, providing both the guidelines and resources that enable local calculation and policy application. This increases the speed with which the policies and networking infrastructure configuration can be updated. Templates provide constraints on the policies that may be calculated, thereby delegating some configuration ability to a local controller. This enables the datacenter networking infrastructure to better scale to large numbers of dynamically instantiated containers and virtual machines, including nested VMs and containers, while maintaining predictability, network stability, and centralized administrative oversight of the network.

Various examples are described below with respect to the figures. These examples are merely exemplary, and embodiments of the present disclosure are not limited to the examples described below and illustrated in the figures.

Figure 1:
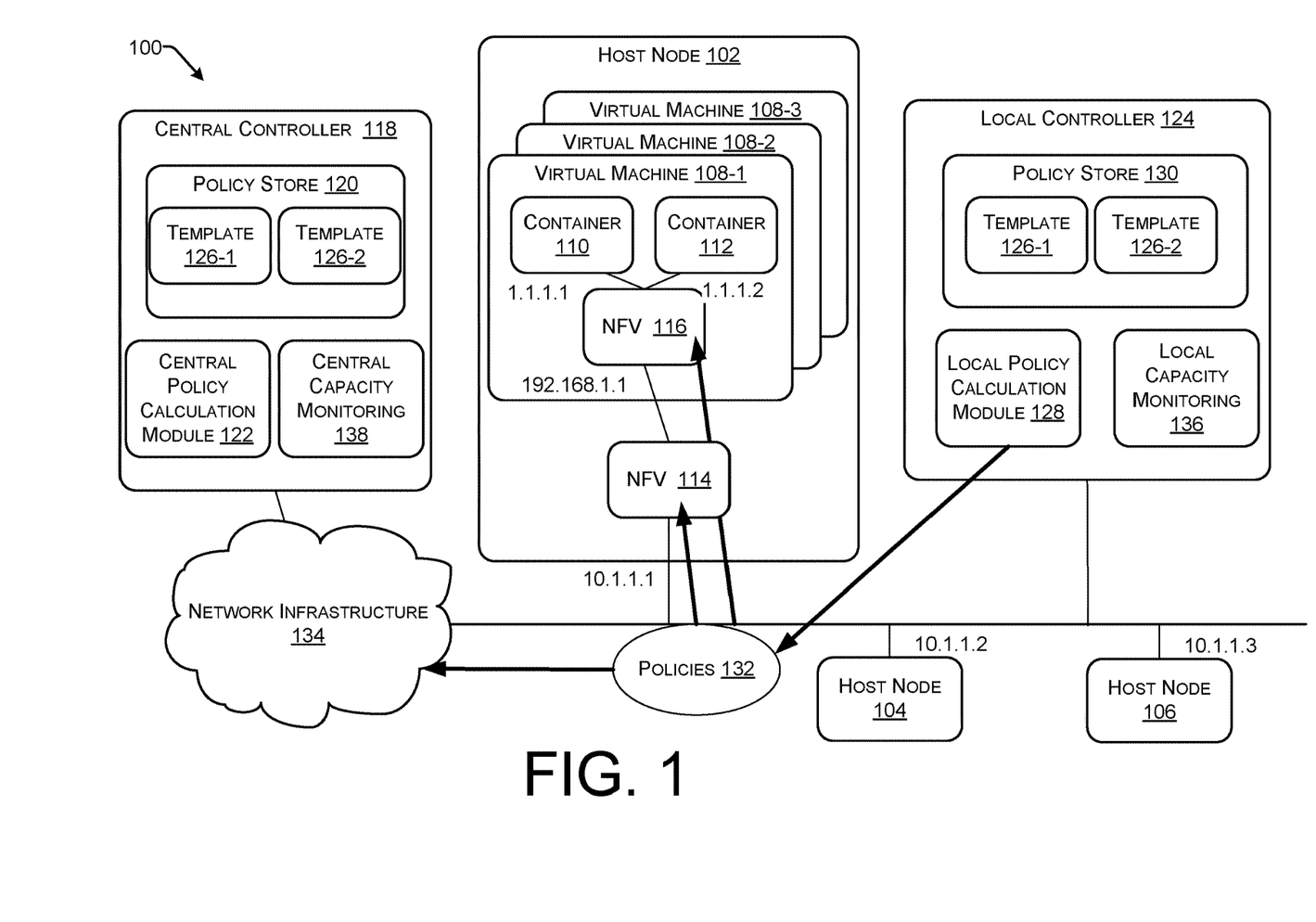
FIG. 1 is a block diagram that illustrates an example environment for template-driven local policy updates for virtualized machines in a datacenter environment.

FIG. 1 is a block diagram that illustrates an example environment for template-driven locally calculated policy updates for virtualized machines in a datacenter environment. Environment 100 includes a plurality of host nodes 102, 104, and 106. The host nodes 102-106 include a plurality of virtual machines (VMs), such as the VMs 108 shown in host node 102. The host node 102 is illustrated as having three virtual machines, but more or fewer virtual machines may be included without departing from the scope of embodiments.

Virtual machine 108-1 includes containers 110 and 112. Although virtual machine 108-1 is illustrated as having two containers 110 and 112, nested VMs may be instantiated within the virtual machines according to embodiments. Containers 110 and 112 are illustrated in FIG. 1 for the sake of description. Also, the virtual machine 108-1 is illustrated as having two containers, but more or fewer containers (or more or fewer nested virtual machines) may be included in a virtual machine without departing from the scope of embodiments. A virtual machine such as virtual machine 108-1 may include up to 200 or more nested VMs or containers in some embodiments.

The host node 102 is illustrated as including a network functions virtualization (NFV) module 114. The NFV 114 is configured to provide virtualized networking functions for the host node 102, such as routing, switching, bridging, firewall functions, network address translation (NAT), encap/decap, load balancing, Dynamic Host Configuration Protocol (DHCP), name resolution service (e.g., DNS resolution), and other virtualized networking functions. Similarly, the virtual machine 108-1 includes NFV module 116, which may provide the same, similar, or different virtualized network functions for the virtual machine 108-1. In some embodiments, a NFV module may be run in a virtual machine or container or distributed among multiple virtual machines and containers.

A central controller 118 (e.g., a central control and monitoring node) includes a policy store 120 and a policy calculation module 122. The policy calculation module 122 calculates, based on configuration from an administrator and/or based on requests from the host nodes and/or local controller 124, one or more templates 126. The templates 126 define various configurable elements of a networking policy that may be calculated by the local controller 124.

Example configurable policy elements defined by the templates 126 include:

1. A pool of resources (e.g., IP addresses, Media Access Control (MAC) addresses, port numbers, and so forth) that may be allocated to containers 110 and 112, or other containers or nested virtual machines within any of the host nodes 102-106.

2. Customer Addresses (CAs) for one or more routing domain identifiers (RDIDs). An RDID may be a uniform resource identifier (URI), or other unique identifier that identifies a group of containers 110, 112 or nested VMs that fall within a single domain of control. Where the containers 110, 112 or nested VMs are part of a customer tenant network within the datacenter environment 100, one or more RDIDs may be utilized to identify those containers 110, 112 or nested VMs. The templates 126 may specify the CAs (e.g., the public-facing IP addresses) that may be allocated to the containers 110, 112 within an RDID.

3. Load balancer Virtual IP (VIP) to dynamic IP (DIP) address mapping. A VIP is the public IP address of the container or nested VM, which may be allocated from a pool defined in the template. The DIP is the internal IP associated with a VM or container. The templates 126 may designate ranges of VIPs and ranges of DIPs that may be mapped for load-balancing or other purposes.

4. Service chain rules. A service chain specifies the network appliances, such as load-balancers, anti-virus scanners, firewalls, deep-packet inspection servers, and so forth, which packets traverse on their way to and from a destination in the datacenter environment 100. The appliances may be virtualized appliances executing as virtual machines on a host in the environment 100, implemented as stand-alone physical appliances, or some combination of these. In some embodiments, a MAC forwarding table specifies the MAC addresses and the order of the appliances in the service chain. The templates 126 specify constraints for service chain configuration, including permissive service chain elements that the local controller 124 may use, as well as mandatory service chain elements that the local controller must specify in a policy for a nested VM or container.

5. Security policies. Security policies include access control lists (ACLs), firewall rules, and so forth for enforcing security policies. The ACLs may specify a 5-tuple of source port, source address, protocol, destination port, and destination address that define packets that are allowed or denied entry into a network through a network device, such as a firewall. The firewall rules may include such things as whether packets are dropped, forwarded, redirected, subjected to stateful or stateless packet inspection, and so forth. The templates 126 may specify aspects of ACLs, firewall rules, and so forth that may be configured by the local controller 124, within certain constraints. A template 126 may specify a list of firewall rules, ACLs and so forth that may be used in a policy, a range of ports that may be permitted, and so forth. The template 126 may also enforce the use of certain ACLs and firewall rules, which cannot be altered by the local controller 124. Thus in some embodiments, the templates 126 may include permissive policy elements that the local controller 124 may use as well as mandatory policy elements that the local controller must use.

6. Local forwarding tables. Local forwarding tables include the destinations with which a VM or container is able to communicate. Local forwarding tables may include encap/decap rules, network address translation rules, and so forth that enable the containers 110, 112 to communicate with other elements within the datacenter environment 100. The local forwarding tables may specify certain ranges of IP addresses that may be reachable by a nested VM or container.

The local controller 124 includes a policy calculation module 128, which determines that nested VMs or containers are instantiated or moved within a local group of host nodes 102-106 or virtual machines 108 for which it has control. The local controller 124 is illustrated as a separate device from the host nodes 102-106, although in some embodiments it may reside on one or more of the host nodes 102-106, as well as being a separate, standalone device or server. The policy calculation module 128 utilizes the templates 126 stored within the policy store 130 to calculate policies 132. The policies 132 include at least the configurable policy elements described elsewhere within this Detailed Description. One or more of the policies 132 may be provided to the NFV 114, the NFV 116, and the network infrastructure 134 of the datacenter environment 100 (e.g., including host nodes 102, 104, 106), as shown with the arrows illustrated in FIG. 1. The policies are usable to reconfigure network elements, such as the NFV 114, the NFV 116, and the network infrastructure 134, to support the various networking functions designated for the containers. For example, the policies may be usable to configure NAT, encap/decap, firewall rules, ACLs, local forwarding, IP address mapping, load-balancing, and various other networking configurations that may be supported in the environment 100. In another example, the policies may be useable and/or tailored to configure virtualized network functions instantiated within virtual machines.

In one example of a configurable policy, host node 102 is illustrated in FIG. 1 having a physical IP address of 10.1.1.1. The VM 108-1 is illustrated having an IP address of 192.168.1.1, and containers 110 and 112 are illustrated as having, respectively, IP addresses 1.1.1.1 and 1.1.1.2. The policies 132 may specify that a newly instantiated container (e.g., container 112) is assigned customer IP address 1.1.1.2. In this case, the templates 126-1 may specify that containers instantiated by the local controller 124 within a certain RDID may be selected from a range of IP addresses that includes 1.1.1.2 (e.g., from the 1.1.0.0/16 subnet). The policies 132 may specify not only the IP address for the container 112, but also the local forwarding tables, including NAT rules and encap/decap rules, which are enforced by one or more of the NFV 114 or the NFV 116, security policies and service chains enforced by the NFV 114 or the NFV 116 as well as resources within the network infrastructure 134, and so forth.

The local capacity monitoring module 136 of the local controller 124 monitors the utilization of its pool of resources defined by the templates 126. Based on certain predetermined mechanisms, the local capacity monitoring module 136 may request additional resources from the central controller 118. For example, a request for more IP addresses may be based on a threshold number of IP addresses being allocated (e.g., 80% of IP addresses allocated), based on current trends in IP address allocation, based on real-time data, and so forth. Similarly, the central capacity monitoring module 138 may also monitor utilization of resources, and assign such resources to the local controller 124 via template updates. By monitoring a local host environment within the larger datacenter environment, the local capacity monitoring module 136 may be able to respond more quickly to depletion of resources than would a central controller 118.

Figure 2:
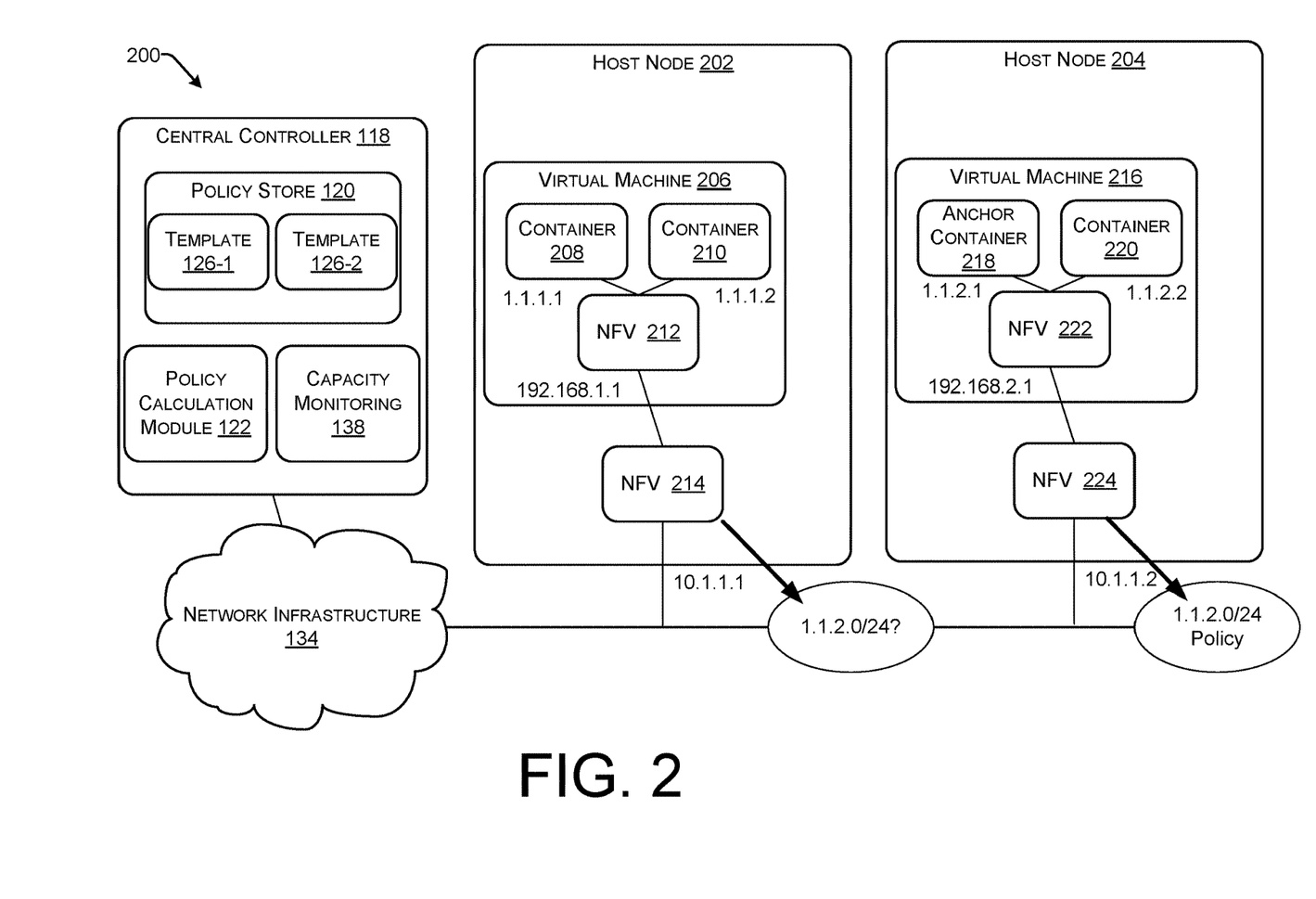
FIG. 2 is a block diagram that illustrates an example environment for discoverability in a dynamic datacenter environment.

FIG. 2 is a block diagram that illustrates an example environment 200 for discoverability in a dynamic datacenter environment. Environment 200 includes host node 202 and host node 204, which may be the same as or similar to the host node 102 illustrated in FIG. 1. Host node 202 includes a virtual machine 206, in which containers 208 and 210 are instantiated. An NFV module 212 provides virtualized networking functions to the container 208 and 210, and to the virtual machine 206 in conjunction with NFV 214. Similarly, host node 204 includes a virtual machine 216, in which containers 218 and 220 are instantiated. An NFV module 222 provides virtualized networking functions to the container 218 and 220, and to the virtual machine 216 in conjunction with NFV 224.

With some containers and nested VMs being instantiated for only short periods of time, it could be difficult to identify and reach such containers and nested VMs via the network infrastructure 134 using conventional methods. Using conventional network discovery mechanisms may take too long to be practical in a dynamic datacenter environment. IP routes may take a few minutes to update. DNS and other naming services take up to 30 minutes to update. A tenant administrator (an administrator of a RDID) may define whether containers in the RDID are to be provided with service availability and may input that into a container management policy.

FIG. 2 illustrates two methods for providing faster discoverability. First, for each container 208, 210, 218, 220 that is configured for service availability, the local control and monitoring node deploys one "IP anchor" container, illustrated in FIG. 2 as the anchor container 218. The role of the "IP anchor" container is to act as a proxy and as a NAT server, thereby providing automatic discoverability and network reachability. All other containers that are deployed on the node or in the RDID have a default IP route to the "IP anchor" container. The local control and monitoring node then monitors the connectivity and DNS records of each of the container services. When the routes and DNS records are available, client software will access the container directly. In at least one example, the local control and monitoring node is configured to provide discoverability services for a virtual machine, a container, or a virtualized network function that has migrated to another system.

In various embodiments, the local control and monitoring node can use an IP anchor to ensure connectivity to a virtualized network function instantiated within a virtual machine. Moreover, the local control and monitoring node can monitor and update a policy that is tailored to a virtualized network function and that is associated with the IP anchor.

In some embodiments, mobile IP, such as is described in IETF RFCs 5944, 6275, and 4721, and others, may be employed. In these embodiments, the container 208, 210, 218, or 220 may be configured with a permanent home address and a care-of address. A home agent (e.g., the anchor container 218), is configured with the care-of address, and acts as a conduit for the other containers within the network. A tunnel is established between the home agent and the containers. Where a container moves to another host, an anchor container 218 on the other host may act as a foreign agent, which acts a conduit for IP addresses for the container.

In some other embodiments, one or more of the NFVs 212, 214, 222, and 224 may be configured to respond to broadcast queries for reachability information. For example, NFV 214 may be configured to provide connectivity services for containers or nested VMs having IP addresses 1.1.1.0/24 subnet, and the NFV 224 may be configured to provide connectivity services for containers or nested VMs having IP addresses in the 1.1.2.0/24 subnet. A neighbor list in the host node 202 and in the host node 204 provides information regarding the host node neighbors. In the example illustrated in FIG. 2, the host node 202 and the host node 204 are both configured with each other in their neighbor lists, along with other host nodes.

When a container 208 or 210 on the host node 202 attempts to contact a container having an IP address in the 1.1.2.0 subnet, the NFV 214 sends a broadcast to its neighbors in the neighbor list for the neighbor having responsibility for the 1.1.2.0 subnet. The NFV 224 responds to the query with a response indicating that host node 204, at IP address 10.1.1.2, is responsible for containers having IP addresses in the 1.1.2.0 subnet. The response may indicate the IP address of the virtual machine 216 (192.168.2.1), so that the encap/decap or NAT may be employed at the various layers of NFV within the host node 202 to reach the 1.1.2.0 subnet. Thus, packets from containers 208 or 210 destined for one of containers 218 or 220 may be forwarded to the NFV 224, using either encap/decap and/or NAT. In some scenarios, if the requested container has moved to a different location, the NFV 224 may again broadcast for the next location and forward to the appropriate NFV using either encap/decap and/or NAT.

The neighbor list may be provided by the central controller 118, by the local controller 124, and so forth. In other embodiments, the central controller 118 and/or the local controller 124 may be configured to provide a list of hosts and related subnets, so that discovery does not need to take place to route packets within an RDID or other local host area.

In various embodiments, configurable network policy elements of a policy template can include sets of network addresses that are loosely associated with each other. The loose association can be based on a policy relationship (e.g., a routing relationship) between a first virtual machine and a second virtual machine. The policy template can be updated when growth and/or changes occur within the environment 200. For example, if the load increases and more containers are added to virtual machine 206, more virtual machines (and associated containers) are added to host node 202, and/or more NFV nodes/modules are configured to handle routing and network policy enforcement, then a policy template may be associated with allocating more subnets to the added network infrastructure elements. Moreover, as the growth and changes occur, some containers may move and/or some containers may be suspended. The movement and the suspension can be tracked and/or monitored by an associated IP anchor, and thus, the IP addresses of moving containers or suspended containers cannot be allocated. Consequently, the policy template configured and distributed by the central controller 118 can account for IP addresses that cannot be allocated. For example, a policy template can provide:

(i) a first set of IP addresses at a first layer such as the physical network (e.g., 10.1.1.1 for host node 202 and 10.1.1.2 for host node 204 from subnet 10.1.1.0/24) and an indication whether an individual IP address is allocated or unallocated, (ii) a second set of IP addresses at a second layer such as the host NVF network (e.g., subnet 192.168.1.0/24 is associated with address 10.1.1.1 and 192.168.1.1 is allocated for a specific NFV 212) and an indication whether an individual IP address is allocated or unallocated, and/or (iii) a third set of IP addresses at a third layer such as the containers (e.g., subnet 1.1.1.0/24 is associated with address 192.168.1.1) and an indication whether an individual IP address is allocated or unallocated.

Moreover, an allocated IP address may be a reachable IP address, an unreachable IP address, or a redirected IP address. Since adding a new subnet may ultimately introduce routing dependencies and/or change downstream routing, the central controller 118 can track the usage of IP addresses and potential allocations of IP addresses so that routing changes can be distributed in time for a particular layer in the above addressing stack to request more IP addresses.

Figure 3:
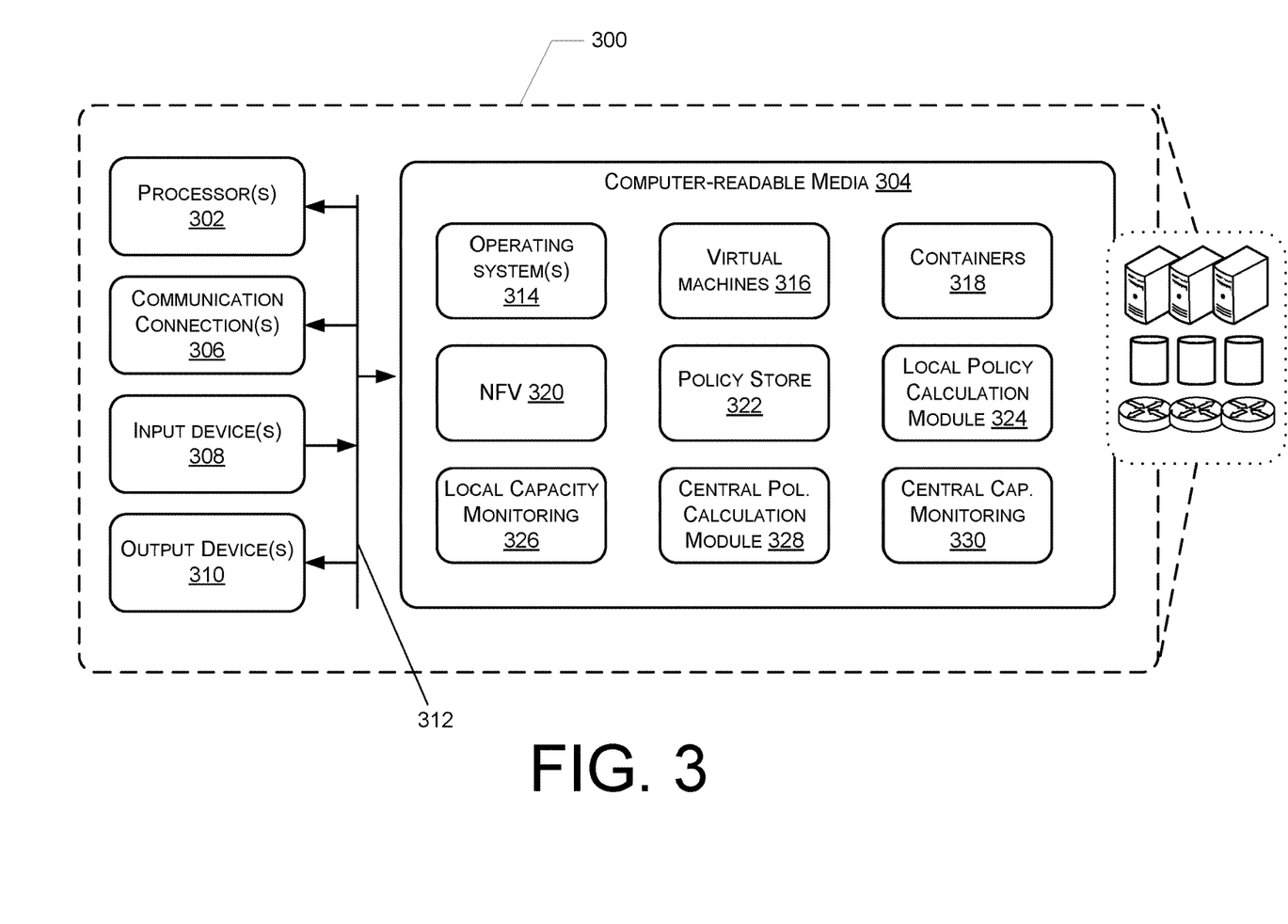
FIG. 3 is a block diagram of an example computing system usable to implement various aspects of the present disclosure.

FIG. 3 is a block diagram of an example computing system 300 usable to implement various aspects of the present disclosure. Computing system 300 may be deployed in a shared network environment, including in a datacenter, a cloud computing environment, or other network of computing devices. In one example configuration, the computing system 300 comprises at least one processor 302 and computer-readable media 304. The computing system 300 also contains communication connection(s) 306 that allow communications with various other systems. The computing system 300 also includes one or more input devices 308, such as a keyboard, mouse, pen, voice input device, touch input device, etc., and one or more output devices 310, such as a display (including a touch-screen display), speakers, printer, etc. coupled communicatively to the processor(s) 302 and the computer-readable media 304 via connections 312.

In the illustrated example, computer-readable media 304 stores operating system(s) 314, which provide basic system functionality to: virtual machines 316 (which may be the same as or similar to one or more of virtual machines 108, 206, and 216), containers 318 (which may be the same as or similar to one or more of containers 110, 112, 208, 210, 218, and 220), NFV 320 (which may be the same as or similar to one or more of NFV 114, 116, 212, 214, 222, and 224), policy store(s) 322 (which may be the same as or similar to one or more of policy store 120 and 130), local policy calculation module 324 (which may be the same as or similar to the local policy calculation module 128), local capacity monitoring 326 (which may be the same as or similar to the local capacity monitoring 136), central policy calculation module 328 (which may be the same as or similar to the central policy calculation module 122), and central capacity monitoring 330 (which may be the same as or similar to the central capacity monitoring 138).

Figure 4:
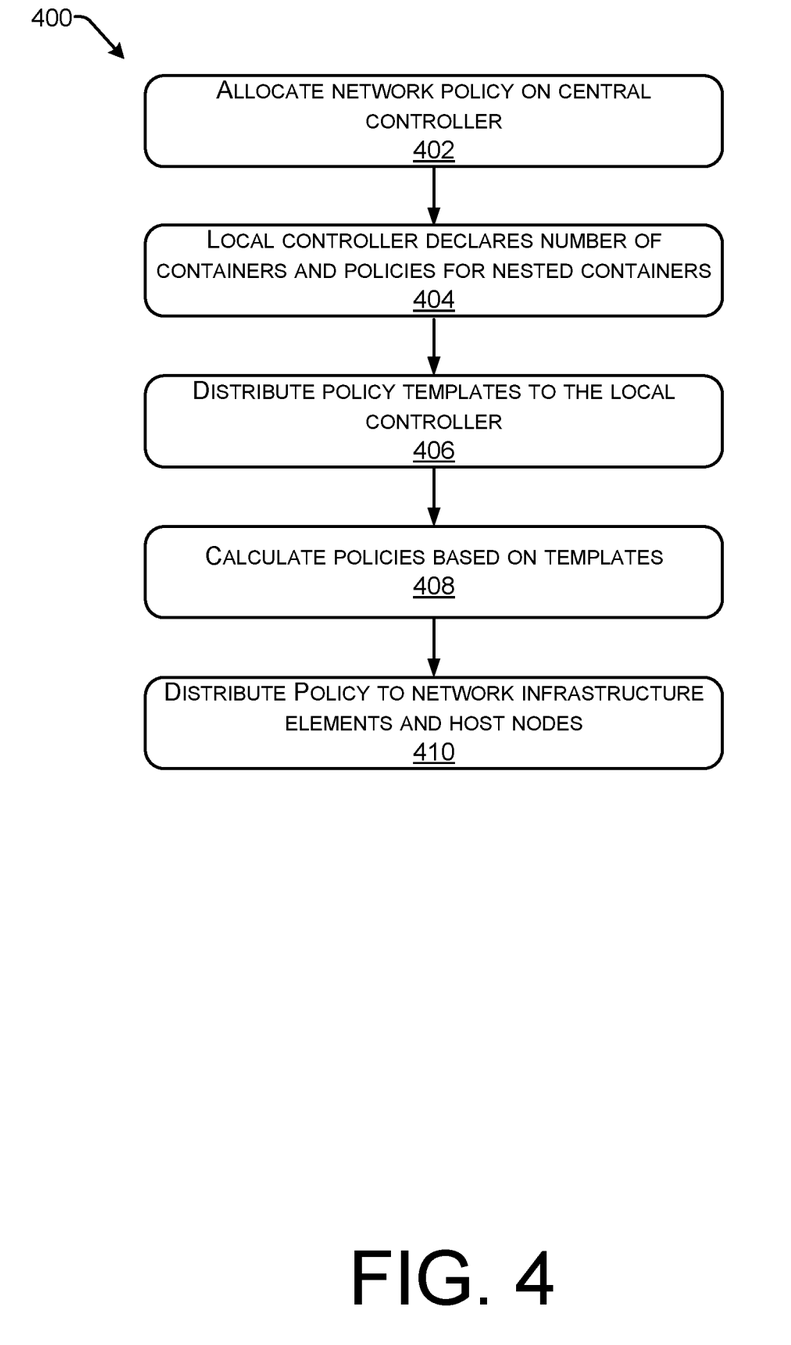
FIG. 4 illustrates a flow chart depicting an example process for template-driven local policy updates for virtualized machines in a datacenter environment.
Figure 5:
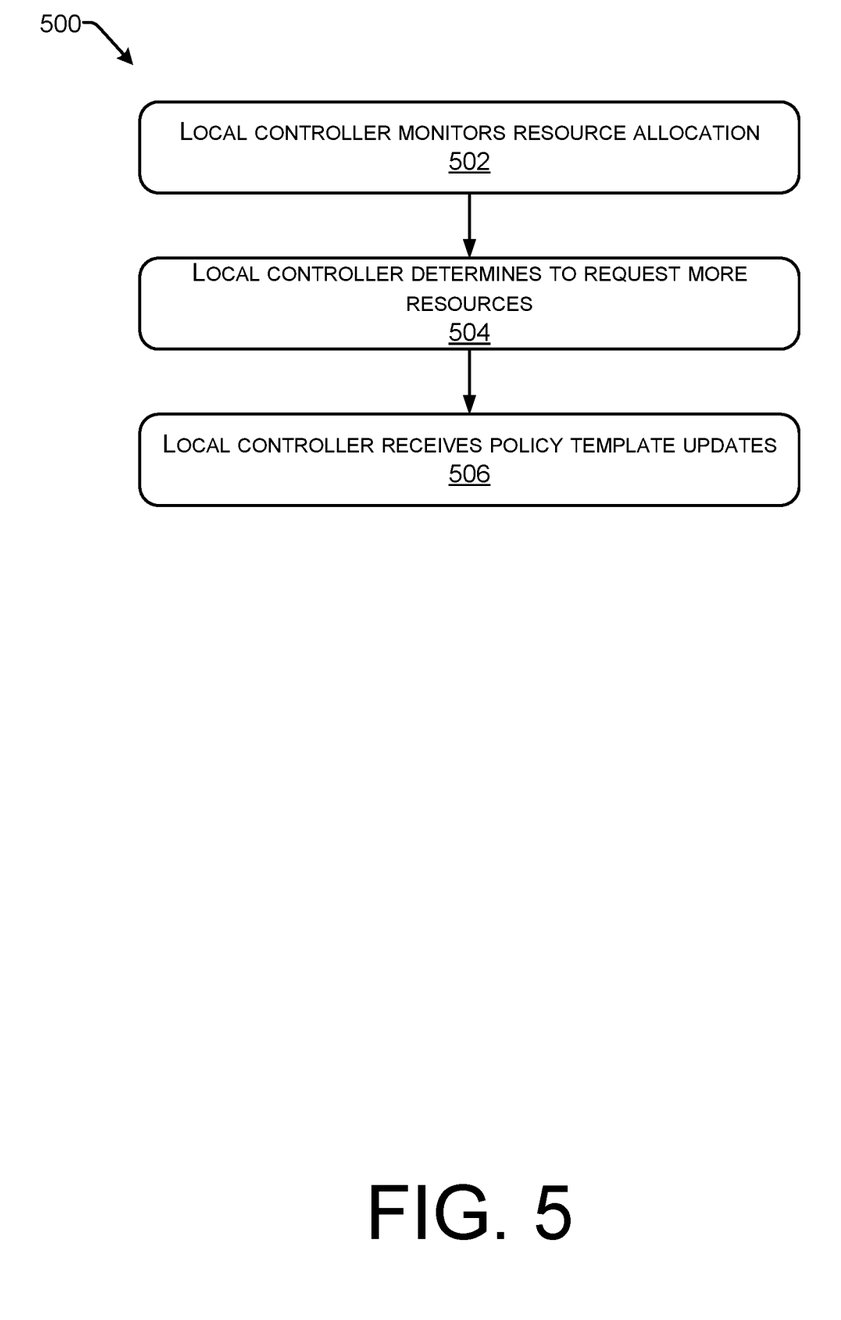
FIG. 5 illustrates a flow chart depicting an example process for monitoring resource utilization in the datacenter network and requesting more resources.

FIGS. 4 and 5 depict flow diagrams that show example processes in accordance with various examples. The operations of these processes are illustrated in individual blocks and summarized with reference to those blocks. These processes are illustrated as logical flow graphs, each operation of which may represent a set of operations that can be implemented in hardware, software, or a combination thereof. In the context of software, the operations represent computer-executable instructions stored on one or more computer storage media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be combined in any order, separated into sub-operations, and/or performed in parallel to implement the processes. Processes according to various examples of the present disclosure may include only some or all of the operations depicted in the logical flow graphs.

FIG. 4 illustrates a flow chart depicting an example process 400 for template-driven local policy updates for virtualized machines in a datacenter environment. At 402, a central administrator allocates the network policy for a given tenant (e.g., an RDID or other local host domain) via a central controller, such as the central controller 118.

At 404, the local controller communicates with the central controller to declare that a host node (such as the host node 102) or a VM (such as the VMs 108) hosts a certain number of containers or nested VMs. The local controller also declares the policies that need to be provided for those containers or nested VMs. Example policy elements that the local controller declares includes one or more IP subnets from which IP end points of the containers are to be allocated.

At 406, the central controller distributes policy templates to the local controller, and thus, the local controller receives the policy template from the central controller. Various policy elements and configuration constraints may be specified within the policy templates, including one or more pools of resources (e.g., IP addresses, Media Access Control (MAC) addresses, port numbers, and so forth) that may be allocated to containers, customer Addresses (CAs) for one or more routing domain identifiers (RDIDs), load balancer Virtual IP (VIP) to dynamic IP (DIP) address mapping, service chain rules, security policies, local forwarding tables, and so forth.

At 408, the local controller calculates the network virtualization policy without the need to contact the central controller, including allocating IP addresses based on the policy templates. Calculating the policies includes calculating the parameters of the policy based on the resources and constraints included in the policy templates.

At 410, the local controller distributes the policies to network infrastructure elements and to the host nodes. The policies are used to configure the network infrastructure elements and the host nodes to provide the appropriate networking connectivity for the nested VMs or containers.

FIG. 5 illustrates a flow chart depicting an example process 500 for monitoring resource utilization in the datacenter network and requesting more resources. At 502, the local controller monitors the resource utilization within the RDID or other local hosting domain. In one example, a percent of resources allocated is determined (e.g., a percent of IP addresses allocated). In another example, trends or predictions regarding future resource utilization is determined. Such trends may be based on real-time data, historical data, current utilization, traffic statistics, or other data that may indicate future resource requirements.

At 504, the local controller determines, based on the resource allocation monitoring, to request additional resources. The local controller may transmit a request to a central controller to request additional resources.

At 506, the local controller receives, in response to the request for more resources, one or more updated policy templates. The policy templates may indicate new constraints on policy elements that the local controller may configure, including an increase in a range of resources that the local controller may allocate to nested VMs or containers, including for example an expanded or otherwise larger range of IP addresses to allocate.

According to various non-limiting examples, the computing systems described herein includes one or more devices, such as servers, storage devices, tablet computers, laptops, desktop computers, gaming consoles, media players, mobile phones, handheld computers, wearable devices, smart appliances, networking equipment, kiosk devices, and so forth. In one example configuration, the computing systems comprise at least one processor. The computing systems also contain communication connection(s) that allow communications with various other systems. The computing systems also include one or more input devices, such as a keyboard, mouse, pen, voice input device, touch input device, etc., and one or more output devices, such as a display (including a touch-screen display), speakers, printer, etc. coupled communicatively to the processor(s) and computer-readable media via connections such as a bus.

Computer-readable media 304 stores computer-executable instructions that are loadable and executable by one or more processor(s), as well as data generated during execution of, and/or usable in conjunction with, these programs. In the illustrated example, computer-readable media stores operating system instances, which provide basic system functionality to applications stored thereon. One or more of these components, including the operating systems, may be instantiated as virtual machines, containers, or as some other type of virtualized instantiation.

Processor(s) 302 may include one or more single-core processing unit(s), multi-core processing unit(s), central processing units (CPUs), graphics processing units (GPUs), general-purpose graphics processing units (GPGPUs), or hardware logic components configured, e.g., via specialized programming from modules or application program interfaces (APIs), to perform functions described herein. In alternative examples one or more functions of the present disclosure may be performed or executed by, and without limitation, hardware logic components including Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processing unit(s) (DSPs), and other types of customized processing unit(s). For example, a processing unit configured to perform one or more of the functions described herein may represent a hybrid device that includes a CPU core embedded in an FPGA fabric. These or other hardware logic components may operate independently or, in some instances, may be driven by a CPU. In some examples, examples of the computing systems may include a plurality of processing units of multiple types. For example, the processing units may be a combination of one or more GPGPUs and one or more FPGAs. Different processing units may have different execution models, e.g., as is the case for graphics processing units (GPUs) and central processing units (CPUs).

Depending on the configuration and type of computing device used, computer-readable media include volatile memory (such as random access memory (RAM)) and/or non-volatile memory (such as read-only memory (ROM), flash memory, 3D XPoint, resistive RAM, etc.). The computer-readable media can also include additional removable storage and/or non-removable storage including, but not limited to, SSD (e.g., flash memory), HDD (Hard Disk Drive) storage or other type of magnetic storage, optical storage, and/or other storage that can provide non-volatile storage of computer-executable instructions, data structures, program modules, and other data for computing systems.

Computer-readable media can, for example, represent computer memory, which is a form of computer storage media. Computer-readable media includes at least two types of computer-readable media, namely computer storage media and communications media. Computer storage media includes volatile and non-volatile, removable and non-removable media implemented in any process or technology for storage of information such as computer-executable instructions, data structures, programming modules, or other data. Computer storage media includes, but is not limited to, phase change memory (PRAM), resistive RAM, 3D Xpoint non-volatile memory, static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other medium that can be used to store information for access and retrieval by a computing device. In contrast, communication media can embody computer-executable instructions, data structures, program modules, or other data in a modulated data signal, such as a carrier wave, or other transmission mechanism. As defined herein, computer storage media does not include communication media.

Various processes described herein are carried out as computing functions in conjunction with networking functions. For example, one computing device or system may cause transmission of a message to another computing device via network interface hardware. This may include, for example, passing by a software module a pointer, argument, or other data to a networking module. The pointer, argument or other data may identify data stored in memory or in a register that is to be transmitted to another computing device. The networking module may include a protocol stack, and may read the data identified by the pointer, argument, or other data. The protocol stack may encapsulate the data in one or more frames, packets, cells, or other data networking protocol structures. The protocol stack may call a network interface device driver, to cause physical transmission of electrical, magnetic, or optical signals along a communication medium to a network element, such as a gateway, router, switch, hub, and so forth. An underlying network may route or switch the data to the destination. The destination computing device may receive the data via a network interface card, which results in an interrupt being presented to a device driver. A processor of the destination computing device passes the device driver an execution thread, which causes a protocol stack to de-encapsulate the data in the packets, frames, and cells in which the data was received. The protocol stack causes the received data to be stored in a memory, a register, or other location. The protocol stack may pass a pointer, argument, or other data that identifies where the received data is stored to a destination software module executing on the destination computing device. The software module receives an execution thread along with the argument, pointer, or other data, and reads the data from the identified location.

Network virtualization has existed for over a decade in the simplistic Host/Guest pattern, more commonly known as the Hypervisor (Host) and VM (Guest) components. The pattern assumes the Host is a physical system mediating access to shared compute, network, and disc on behalf of guests. Network accelerations from Host to Guest typically encompass stateless offloads—such as large segment offload (LSO), large receive offload (LRO), TCP Offload (TO) and stateful offloads, such as I/O virtualization (IOV)) offloads, and so forth. Stateless offloads are software-mediated through the Virtual Switch (vSwitch) layers to the Host incurring a non-negligible processing cost at high density and at high speeds, such as at 40 Gbps+ speeds. Stateful offloads completely bypass the host for network access yielding near native performance.

Both aforementioned offload models contain flaws that impact their applicability in Container Nested Network Virtualization (CNNV) models. In CNNV, the guest contains a virtual switch (vSwitch) that hosts multiple host virtual network interface cards (virtual NIC or vNIC) and/or host NICs (hNICs). Containers have their own NIC, compartmentalized TCP/IP stack, and shared Kernel, thus appearing as conventional entities on the network. Containers are lightweight (relative to a VM), and thus can achieve densities of several orders of magnitude on a physical system.

Using a Nested vSwitch to address container networking has several advantages. Namely architectural correctness for OSI Layers, reusability of existing components, and future applicability to nested VMs. However, this does mean that the software processing cost for packet transfers from Miniport to hNIC endpoint is duplicated, potentially leading to scalability limitations.

The IOV model addresses the SW performance concerns but introduces undesired coupling points from Guest to HW, complicating operations such as VM mirroring and migration. Since IOV bypasses the host, network policy and security are bypassed, exposing the network fabric to potentially malicious guests.

In some embodiments, these issues are addressed with Synthetic Packet Direct (PD). The Synthetic PD model consists of a PD Provider Interface (PDPI) and PD Consumer Interface (PDCI). Under the PD model a PDPI presents a queue for PDCI controlled Ethernet packet Post and Drain operations. The vSwitch acts as a PDCI on the Host, consuming the network Frames and converting to traditional specific NBLs before delivery to VMBus such that the VM ingress frame processing is unchanged.

With Synthetic PD, the Queues are projected from the Adapter on the Physical Host directly into the Guest via a shared memory pluggable PD buffer model. The end result is the adapter DMAs frames directly into the Guest buffers of the hNIC associated with the Container. Frame processing occurs within the hNIC scope, thus the Host processing costs are circumvented (excluding optional network policies applied to headers via Header Data Split (HDS)). Furthermore, the aforementioned IOV constraints are also avoided since there is no HW coupling in the guest. The association of PD endpoint in the Guest to adapter PD queue is mediated through the shared memory buffer model. As such, mirroring and migration operations are simplified.

Embodiments include a method to create, allocate, provision, and track receive queues based on MAC address and IP address. In some embodiments, the receive queues are created, allocated and tracked by the operating system. Traffic is steered to containers based on one or more of: an affinity to a specific MAC address when Containers are layer two (L2) addressable externally, an affinity to both destination MAC and IP address if Containers are bridged via MAC rewrites, where layer 3 (L3) is the container identifier, and an affinity based on a virtual network, a MAC address and an IP address.

Embodiments include a system comprising a software application in a container accessible by servers or clients to obtain information via a network I/O. One or more physical hosts have DPDK or PD capable NIC. One or more VMs hosted on the physical host include one or more containers. A configuration store that contains a container queue information. In some embodiments, the physical host is a computer, a kiosk, a mobile device, a game console or a multi-user, multi-application server.

EXAMPLE CLAUSES

Example A, a system comprising: a local controller configured to: monitor resource utilization of the system; receive a policy template that includes one or more configurable network policy elements from a central controller; calculate a network virtualization policy for at least one virtualized computing resource implemented within one or more nodes associated with the local controller, the network virtualization policy being based at least on the received policy template and the monitored resource utilization and the network virtualization policy configuring network connectivity for the at least one virtualized computing resource; and distribute the network virtualization policy to one or more network infrastructure elements and/or to the one or more nodes; and a local store configured to store the monitored resource utilization, the policy template, and the calculated network virtualization policy.

Example B, the system of Example A, wherein the local controller is further configured to request, based at least on the monitored resource utilization and from the central controller, an updated policy template that indicates a change in the configurable network policy elements, the change providing additional networking resources.

Example C, the system of Example A or Example B, wherein the at least one virtualized computing resource includes a first virtual machine and/or a container executing within a second virtual machine.

Example D, the system of Example C, wherein the one or more configurable network policy elements includes a plurality of sets of network addresses that are associated with each other based on a policy relationship between the first virtual machine and the second virtual machine, the local controller configured to allocate at least one network address selected from the plurality of sets of network addresses to the at least one virtualized computing resource.

Example E, the system of Example C, wherein the one or more configurable network policy elements includes a plurality of sets of security policies that are associated with each other based on a policy relationship between the first virtual machine and the second virtual machine, the local controller configured to allocate at least one security policy selected from the plurality of sets of security policies to the at least one virtualized computing resource.

Example F, the system of Example C, wherein the one or more network infrastructure elements includes at least one virtualized network function instantiated within the first virtual machine, the local controller configured to monitor and update a policy that is tailored to the virtualized network function.

Example G, the system of Example C, wherein the local controller is configured to use one or more IP anchors to ensure connectivity to at least one virtualized network function instantiated within the first virtual machine, the local controller configured to monitor and update a policy that is tailored to the at least one virtualized network function and that is associated with the one or more IP anchors.

Example H, the system of any one of Example A through Example F, wherein the local controller is configured to use one or more IP anchors to ensure connectivity to at least one node of the one or more nodes that has received a policy update from the local controller.

Example I, the system of any one of Example A through Example H, wherein the local controller is configured to provide discoverability services for a virtual machine, a container, or a virtualized network function that has migrated to another system.

Example J, a method comprising: monitoring, by a local controller, resource utilization of a system; receiving, at the local controller and from a central controller, a policy template that includes one or more configurable network policy elements; calculating, based at least on the received policy template and the monitored resource utilization, a network virtualization policy for at least one virtualized computing resource implemented within one or more nodes associated with the local controller, the network virtualization policy configuring network connectivity for the at least one virtualized computing resource; and distributing, by the local controller, the network virtualization policy to one or more network infrastructure elements and/or to the one or more nodes.

Example K, the method of Example J, further comprising requesting, based at least on the monitored resource utilization and from the central controller, an updated policy template that indicates a change in the configurable network policy elements, the change providing additional networking resources.

Example L, the method of Example J or Example K, wherein the at least one virtualized computing resource includes a first virtual machine and/or a container executing within a second virtual machine.

Example M, the method of Example L, wherein the one or more configurable network policy elements includes a plurality of sets of network addresses that are associated with each other based on a relationship between the first virtual machine and the second virtual machine and wherein the method further comprises distributing, by the local controller at least one network address selected from the plurality of sets of network addresses to the one or more nodes.

Example N, the method of Example L, wherein the one or more configurable network policy elements includes at least a plurality of sets of security policies that are associated with each other based on a routing relationship between the first virtual machine and the second virtual machine, the method further comprising allocating at least one security policy selected from the plurality of sets of security policies to the at least one virtualized computing resource.

Example O, the method of Example L, wherein the one or more network infrastructure elements includes at least one virtualized network function instantiated within the first virtual machine, the method further comprising monitoring and updating a policy that is tailored to the virtualized network function.

Example P, the method of Example L, further comprising: using one or more IP anchors to ensure connectivity to at least one virtualized network function instantiated within the first virtual machine; and monitoring and updating a policy that is tailored to the at least one virtualized network function and that is associated with the one or more IP anchors.

Example Q, the method of any one of Example J through Example O, further comprising using one or more IP anchors to ensure connectivity to at least one node of the one or more nodes that has received a policy update from the local controller.

Example R, the method of any one of Example J through Example Q, further comprising providing discoverability services for a virtual machine, a container, or a virtualized network function that has migrated to another system.

Example S, a system comprising: one or more processors; computer-readable media; programming instructions stored on the computer-readable media and executable by the one or more processors to: receive a policy template for a local environment that includes one or more nodes, the policy template indicating one or more configurable network policy elements allocated to one or more virtualized computing resources instantiated within the one or more nodes; determine, based at least in part on the policy template, a network virtualization policy for at least one virtualized computing resource instantiated within the one or more nodes, the network virtualization policy providing connectivity to the at least one virtualized computing resource; distribute the network virtualization policy to one or more network infrastructure elements and/or to the one or more nodes; monitor network resource utilization within the one or more nodes; and request an updated policy template that indicates a change in the one or more configurable network policy elements to provide additional network resources allocated to the one or more virtualized computing resources instantiated within the one or more nodes or to one or more new virtualized computing resources instantiated within the one or more nodes.

Example T, the system of Example S, wherein the programming instructions are further executable by the one or more processors to: receive the updated policy template responsive to the requesting the updated policy template; and determine an updated network virtualization policy for one or more of the at least one virtualized computing resource or a new virtualized computing resource.

CONCLUSION

Although the techniques have been described in language specific to structural features and/or methodological acts, it is to be understood that the appended claims are not necessarily limited to the features or acts described. Rather, the features and acts are described as example implementations.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof. Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are within the scope of this disclosure and protected by the following claims.

What is claimed is:

1. A system comprising:
one or more processors;
computer-readable media;
programming instructions stored on the computer-readable media and executable by the one or more processors to:
monitor network resource allocation for one or more virtual machines instantiated within one or more nodes;
determine, based on the monitoring of the network resource allocation, to request additional network resources;
request, based on the determining, the additional network resources; and
receive a policy template for allocation of the additional network resources amongst the one or more virtual machines instantiated within the one or more nodes.

2. The system of claim 1, wherein the programming instructions are further executable by the one or more processors to determine that a threshold amount of available network resources are allocated, the determining to request the additional network resources is based on the determining that the threshold amount of available network resources are allocated.

3. The system of claim 1, wherein the policy template indicates a change to one or more configurable network policy elements allocated to the one or more virtual machines instantiated within the one or more nodes.

4. The system of claim 3, wherein the one or more configurable network policy elements comprise one or more of: Internet Protocol (IP) addresses, Media Access Control (MAC) addresses, or port numbers.

5. The system of claim 3, wherein the one or more configurable network policy elements comprise customer addresses (CAs) for one or more routing domain identifiers (RDIDs).

6. The system of claim 3, wherein the one or more configurable network policy elements comprise load balancer virtual Internet Protocol (VIP) address to dynamic Internet Protocol (DIP) address mappings.

7. The system of claim 3, wherein the one or more configurable network policy elements comprise constraints for service chain configuration, wherein the service chain configuration comprise a path of service chain elements a data packet traverses during communication to or from a destination in a datacenter.

8. The system of claim 7, wherein an individual service chain element comprises a load balancer, an anti-virus scanner, a firewall, or a deep-packet inspection server.

9. The system of claim 3, wherein the one or more configurable network policy elements comprise an access control list (ACL) useable to enforce security policies, wherein the ACL specifies one or more of a source port, a source address, a protocol, a destination port, or a destination address that define packets that are allowed or denied entry into a network through a network device.

10. The system of claim 3, wherein the one or more configurable network policy elements comprise local forwarding tables that include a destination with which a virtual machine is able to communicate, wherein the local forwarding tables include encapsulate/decapsulate rules, network address translation rules, or a range of IP addresses that are reachable by the virtual machine.

11. The system of claim 1, wherein the one or more nodes comprise a local environment of a datacenter, at least one of the one or more virtual machines comprises a nested virtual machine, and the programming instructions are further executable by the one or more processors to:
calculate a policy based on the policy template and distribute the policy; and
distribute the policy to the one or more nodes.

12. A system comprising:
one or more processors;
computer-readable media;
programming instructions stored on the computer-readable media and executable by the one or more processors to:
monitor network resource allocation for one or more containers instantiated within one or more nodes;
determine, based on the monitoring of the network resource allocation, to request additional network resources;
request, based on the determining, the additional network resources; and
receive a policy template for allocation of the additional network resources amongst the one or more containers instantiated within the one or more nodes.

13. The system of claim 12, wherein the programming instructions are further executable by the one or more processors to determine that a threshold amount of available network resources are allocated, the determining to request the additional network resources is based on the determining that the threshold amount of available network resources are allocated.

14. The system of claim 12, wherein the policy template indicates a change to one or more configurable network policy elements allocated to the one or more containers instantiated within the one or more nodes.

15. The system of claim 14, wherein the one or more configurable network policy elements comprise one or more of: Internet Protocol (IP) addresses, Media Access Control (MAC) addresses, port numbers, or customer addresses (CAs) for one or more routing domain identifiers (RDIDs).

16. The system of claim 14, wherein the one or more configurable network policy elements comprise load balancer virtual Internet Protocol (VIP) address to dynamic Internet Protocol (DIP) address mappings.

17. The system of claim 14, wherein the one or more configurable network policy elements comprise constraints for service chain configuration, wherein the service chain configuration comprise a path of service chain elements a data packet traverses during communication to or from a destination in a datacenter and an individual service chain element comprises a load balancer, an anti-virus scanner, a firewall, or a deep-packet inspection server.

18. The system of claim 14, wherein the one or more configurable network policy elements comprise an access control list (ACL) useable to enforce security policies, wherein the ACL specifies one or more of a source port, a source address, a protocol, a destination port, or a destination address that define packets that are allowed or denied entry into a network through a network device.

19. The system of claim 14, wherein the one or more configurable network policy elements comprise local forwarding tables that include a destination with which a container is able to communicate, wherein the local forwarding tables include encapsulate/decapsulate rules, network address translation rules, or a range of IP addresses that are reachable by the container.

20. A method comprising:
monitoring, by a local controller, network resource allocation for one or more virtual machines or containers instantiated within one or more nodes;
determining, based on the monitoring of the network resource allocation, to request additional network resources;
requesting, based on the determining, the additional network resources from a central controller; and
receiving, from the central controller, a policy template for allocation of the additional network resources amongst the one or more virtual machines or containers instantiated within the one or more nodes.

* * * * *